United States Patent
Iwasaki et al.

(10) Patent No.: US 9,361,219 B2
(45) Date of Patent: Jun. 7, 2016

(54) INFORMATION PROCESSING DEVICE, INFORMATION PROCESSING METHOD AND PROGRAM PRODUCT

(71) Applicants: Ryo Iwasaki, Kanagawa (JP); Reiji Yukumoto, Kanagawa (JP); Yoshifumi Kawai, Kanagawa (JP); Hiroshi Maeda, Kanagawa (JP)

(72) Inventors: Ryo Iwasaki, Kanagawa (JP); Reiji Yukumoto, Kanagawa (JP); Yoshifumi Kawai, Kanagawa (JP); Hiroshi Maeda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 667 days.

(21) Appl. No.: 13/645,995

(22) Filed: Oct. 5, 2012

(65) Prior Publication Data

US 2013/0091338 A1    Apr. 11, 2013

(30) Foreign Application Priority Data

Oct. 11, 2011 (JP) .................................. 2011-224215

(51) Int. Cl.
*G06F 12/02* (2006.01)

(52) U.S. Cl.
CPC .... *G06F 12/0246* (2013.01); *G06F 2212/7201* (2013.01)

(58) Field of Classification Search
CPC  G06F 8/65; G06F 12/0246; G06F 2212/7201
See application file for complete search history.

(56) References Cited

U.S. PATENT DOCUMENTS

| | | | |
|---|---|---|---|
| 2004/0093592 A1* | 5/2004 | Rao | 717/168 |
| 2004/0194081 A1* | 9/2004 | Qumei et al. | 717/173 |
| 2011/0007365 A1 | 1/2011 | Yukumoto et al. | |
| 2011/0299115 A1 | 12/2011 | Toda et al. | |
| 2011/0310409 A1 | 12/2011 | Yukumoto et al. | |
| 2012/0047242 A1 | 2/2012 | Iwasaki et al. | |
| 2012/0127522 A1 | 5/2012 | Uchiyama et al. | |
| 2012/0215883 A1 | 8/2012 | Noguchi et al. | |
| 2012/0221365 A1 | 8/2012 | Maeda | |
| 2012/0221947 A1 | 8/2012 | Yukumoto et al. | |

FOREIGN PATENT DOCUMENTS

| | | |
|---|---|---|
| JP | 2008-065618 | 3/2008 |
| JP | 2008-221600 | 9/2008 |

* cited by examiner

*Primary Examiner* — Gary W Cygiel
(74) *Attorney, Agent, or Firm* — Oblon, McClelland, Maier & Neustadt, L.L.P.

(57) ABSTRACT

An information processing device includes a first storage unit configured to store a set value indicating a value corresponding to a set item to define a function and flag information indicating whether an initialization of the set value is required, a second storage unit configured to store a flag address identifying a storage location of the flag information in the first storage unit in association with the set item at least, and an initialization unit configured to identify the flag information for each set item by using the flag address corresponding to each set item, and if the identified flag address indicates that the initialization is required, initialize the set value corresponding to the set item.

4 Claims, 13 Drawing Sheets

| SET ITEM | STORAGE LOCATION HEAD ADDRESS | SIZE | DEFAULT VALUE | FLAG ADDRESS |
|---|---|---|---|---|
| SET VALUE A | 0x0000 | 32 | abcdefg | 0x1000 |
| SET VALUE B | 0x0020 | 1 | 0 | 0x1001 |
| SET VALUE C | 0x0021 | 6 | ffffff | 0x1002 |

| SET ITEM | STORAGE LOCATION HEAD ADDRESS | SIZE | DEFAULT VALUE | FLAG ADDRESS |
|---|---|---|---|---|
| SET VALUE A | 0x0000 | 32 | abcdefg | 0x1000 |
| SET VALUE B | 0x0020 | 1 | 0 | 0x1001 |
| SET VALUE C | 0x0021 | 6 | ffffff | 0x1002 |

| SET ITEM | STORAGE LOCATION HEAD ADDRESS | SIZE | DEFAULT VALUE | FLAG ADDRESS |
|---|---|---|---|---|
| SET VALUE A | 0x0000 | 32 | abcdefg | 0x1000 |
| SET VALUE B | 0x0020 | 1 | 0 | 0x1001 |
| SET VALUE C | 0x0021 | 6 | ffffff | 0x1002 |
| SET VALUE D ← ADDED | 0x0027 | 4 | 3000 | 0x1003 |

| MOVED SET ITEM | HEAD ADDRESS BEFORE MOVING | SIZE | HEAD ADDRESS AFTER MOVING |
|---|---|---|---|
| SET VALUE A | 0x0000 | 32 | 0x2000 |

| MOVED SET ITEM | HEAD ADDRESS BEFORE MOVING | SIZE | HEAD ADDRESS AFTER MOVING |
|---|---|---|---|
| SET VALUE A | 0x0000 | 32 | 0x3000 |

SET VALUE XXX IS ADDED.
PLEASE PRESS "MANUAL SETTING" IN CASE OF SETTING VALUE MANUALLY, OR PRESS "DEFAULT VALUE" IN CASE OF SETTING VALUE TO DEFAULT VALUE

MANUAL SETTING    DEFAULT VALUE

VACANT REGION

REGION WHERE SET
VALUE IS STORED

REGION WHERE FLAG
INFORMATION IS STORED

| SET ITEM | STORAGE LOCATION HEAD ADDRESS | SIZE | DEFAULT VALUE | FLAG ADDRESS |
|---|---|---|---|---|
| SET VALUE A | 0x0000 | 4 | 0 | 0x1003 |
| SET VALUE B | 0x0004 | 1 | 0 | 0x1001 |
| SET VALUE C | 0x0005 | 6 | ffffff | 0x1002 |
| SET VALUE D | 0x000c | 4 | 0 | 0x1003 |

| SET ITEM | DEPENDENT SET ITEM |
|---|---|
| SET VALUE D | SET VALUE A |

INFORMATION PROCESSING DEVICE, INFORMATION PROCESSING METHOD AND PROGRAM PRODUCT

CROSS-REFERENCE TO RELATED APPLICATIONS

The present application claims priority to and incorporates by reference the entire contents of Japanese Patent Application No. 2011-224215 filed in Japan on Oct. 11, 2011.

BACKGROUND OF THE INVENTION

1. Field of the Invention

The present invention relates to an information processing device, an information processing method and a program product.

2. Description of the Related Art

In recent years, most of the information processing devices are equipped with control units (may be called also embedded systems) including CPUs, memories for storing programs and the like, as electric and electronic technology gets more sophisticated and complicated. The program for the basic control of the information processing device is called firmware. In the recent information processing devices, the firmware is becoming to be updatable for the purpose of adding functions, improving performances, fixing defects and so on.

When the firmware is updated, set values for functions of the information processing device may be added. The set values are typically stored in non-volatile memories. If the set values are added, however, the functions may change. Therefore, unless initializing properly, the firmware may not function properly after updated. Therefore, there is known a technology of updating the firmware by downloading a conversion table for converting (initializing) the set values before the firmware is updated into values corresponding to updated firmware, when the firmware is updated (for example, Japanese Patent Application Laid-open No. 2008-65618).

In the prior art technology, however, the downloading of the conversion table is required every time when the firmware is updated. And, the conversion table is required to be prepared for each set value. Therefore, there is a need to identify which conversion table is to be used, before updating the firmware. Furthermore, as the update of the firmware is repeated and kinds of set values increase, the required conversion table increases. Therefore, the burden of managing the conversion tables at the firmware releaser side becomes heavier and more complicated. The present invention has been accomplished in view of the above problems.

SUMMARY OF THE INVENTION

It is an object of the present invention to at least partially solve the problems in the conventional technology.

An information processing device includes a first storage unit configured to store a set value indicating a value corresponding to a set item to define a function and flag information indicating whether an initialization of the set value is required, a second storage unit configured to store the set item and a flag address identifying a storage location of the flag information in the first storage unit, in association with each other at least, and an initialization unit configured to identify the flag information for each set item by using the flag address corresponding to each set item, and if the identified flag address indicates that the initialization is required, initialize the set value corresponding to the set item.

An information processing method includes reading out a flag address for each set item with reference to a second storage unit, in which a set value indicating a value corresponding to a set item for defining a function and flag information indicating whether an initialization of the set value is required are stored in a first storage unit, and the flag address for identifying a storage location of the flag information in the first storage unit is stored in association with the set item in the second storage unit, reading out the flag information from the first storage unit, the flag information being identified by the read out flag address, and initializing the set value, when the flag information indicates that the initialization of the set value is required.

A computer program product is embodied as a non-transitory computer-readable medium having computer-readable program codes embedded therein, the program codes when executed causing a computer to execute reading out a flag address for each set item with reference to a second storage unit, in which a set value indicating a value corresponding to a set item for defining a function and flag information indicating whether an initialization of the set value is required are stored in a first storage unit, and the flag address for identifying a storage location of the flag information in the first storage unit is stored in association with the set item in the second storage unit, reading out the flag information from the first storage unit, the flag information being identified by the read out flag address, and initializing the set value, when the flag information indicates that the initialization of the set value is required.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Now, embodiments of the information processing device according to the present invention will be described in detail, with reference to the accompanying drawings. In the following embodiments, a projector capable of projecting an image on a screen is explained as an information processing device. However, the information processing device is not limited to it.

Figure 1:
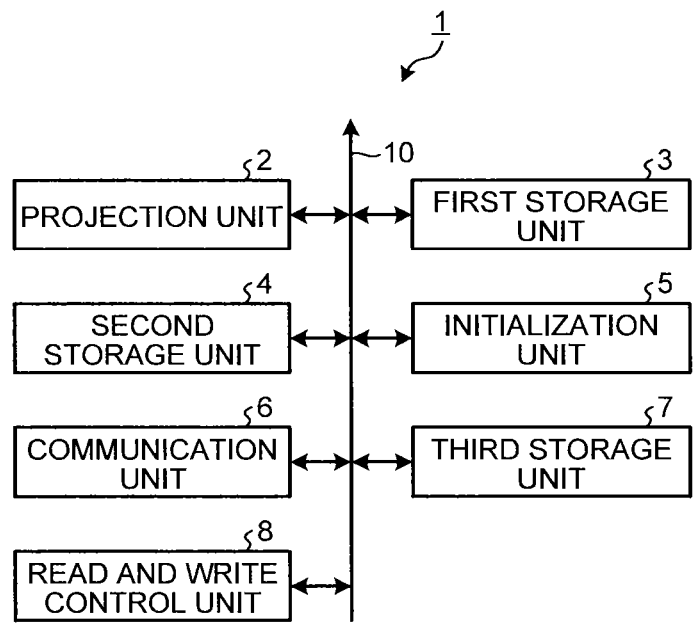
FIG. 1 is a block diagram illustrating an exemplary configuration of an information processing device according to an embodiment.

FIG. 1 illustrates an exemplary configuration of the information processing device 1 according to the present embodiment. As illustrated in FIG. 1, the information processing device 1 includes a projection unit 2, a first storage unit 3, a second storage unit 4, an initialization unit 5, a communication unit 6, a third storage unit 7, and a read and write control unit 8. These units are mutually connected via bus 10.

Figure 2:
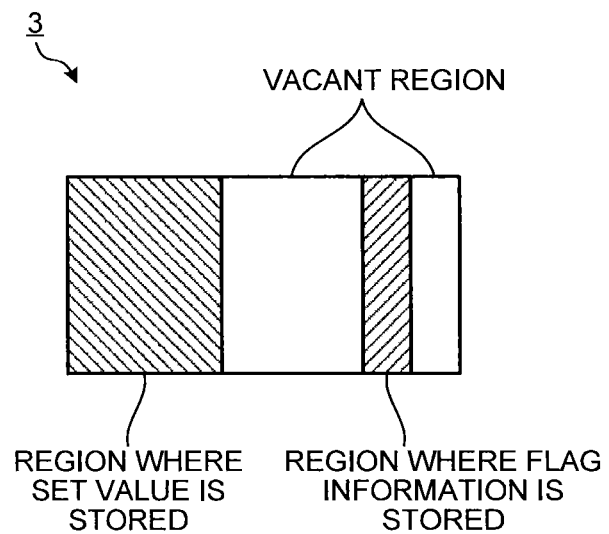
FIG. 2 is a view conceptually illustrating an exemplary configuration of a first storage unit.

The projection unit 2 controls a projection and display of an image on a screen. The first storage unit 3 is a non-volatile device (memory) for storing (i) a set value indicating a value corresponding to a set item to define a function of the information processing device 1, and (ii) flag information indicating whether the initialization of the set value is required. FIG. 2 conceptually illustrates an exemplary configuration of the first storage unit 3. As illustrated in FIG. 2, the first storage unit includes a region where the set value is stored (hereinafter, may be called "the first region"), a region where the flag information is stored (hereinafter, may be called "the second region"), and a vacant region. In the present embodiment, every time when a new set value for a new set item is added due to the update of the firmware, the region where the newly added set value is stored and the region where the flag information of this set value is stored are sequentially formed in the vacant region, respectively. In this example, the flag information indicating that the initialization is required is pre-stored as a default value, in each region of the vacant region where the data is to be stored, so that the corresponding set value is in a state requiring the initialization when the new set value is added.

Figures 3, 4:
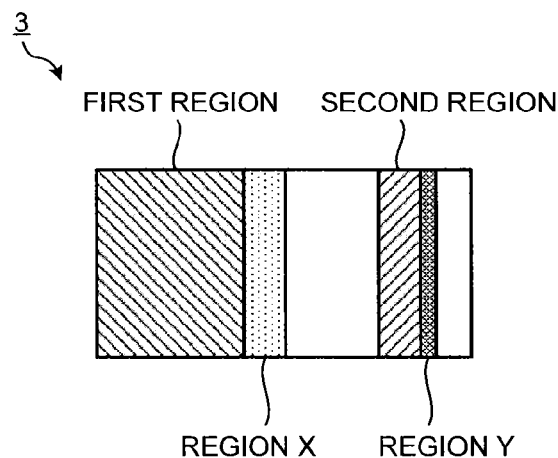
FIG. 3 is a table illustrating an exemplary configuration of a second storage unit.
FIG. 4 is a view illustrating an exemplary configuration of the first storage unit where new set items are added due to the update of the firmware.

The second storage unit 4 stores (i) a program (firmware) for operating the information processing device 1, and (ii) information about the set value stored in the first storage unit 3. In the present embodiment, the second storage unit 4 stores the set item and the flag address to identify the location where the flag information is stored in the first storage unit 3. The set item and the flag address are mutually associated at least, when stored in the second storage unit 4. FIG. 3 illustrates an exemplary configuration of the second storage unit 4. As illustrated in FIG. 3, in the present embodiment, the second storage unit 4 stores the set item, the storage location head address to identify a location where the set value corresponding to the set item is stored in the first storage unit 3 (a first set value address), the set value size, the default value to be used for initializing the set value, and the flag address in association with each other. Incidentally, in this example, all the information stored in the second storage unit 4 is updated when the firmware is updated.

The initialization unit 5 identifies the flag information by using the corresponding flag address for each set item. If the identified flag information indicates that the initialization is required, the initialization unit 5 initializes the set value corresponding to the set item. In the present embodiment, when the information processing device 1 is at start-up, the initialization unit 5 reads out the corresponding flag address for each set item from the second storage unit 4, and, by using the read out flag address, the initialization unit 5 reads out the flag information from the first storage unit 3. If the read out flag information indicates that the initialization is required, the initialization unit 5 initializes the set value of the corresponding set item. More particularly, if the flag information corresponding to the set item indicates that the initialization is required, the initialization unit 5 initializes the set value corresponding to the set item by writing the default value corresponding to the set item at a location in the first storage unit 3 identified by the storage location head address (the first set value address) corresponding to the set item.

Figures 5, 6:
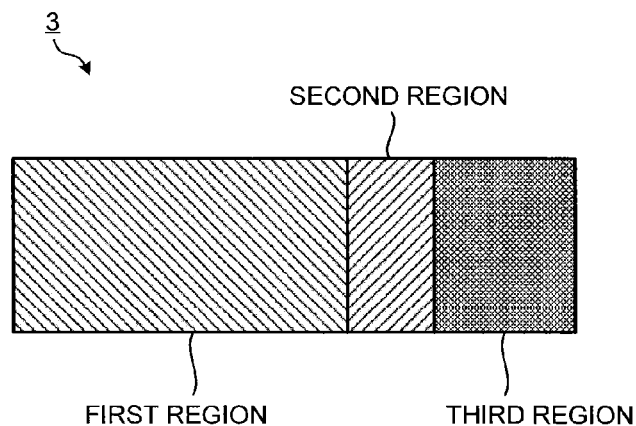
FIG. 5 is a table illustrating an exemplary configuration of the second storage unit where new set items are added due to the update of the firmware.
FIG. 6 is a view conceptually illustrating an exemplary configuration of the first storage unit.

Now, it is assumed that "set value D" as the set item is added in accordance with the update of the firmware. In this case, as illustrated in FIG. 4, in the vacant region of the first storage unit 3, a region X where the set value "set value D" as the set item is stored and a region Y where the flag information of the set value is stored are allocated. As described above, in each of regions in the vacant region where the respective data are stored, the flag information indicating that the initiation is required is prestored as default value. Therefore, in each of the region X and the region Y, the flag information indicating that the initialization is required is stored. Also, as illustrated in FIG. 5, to the second storage unit 4, the set item "set value D", the storage location head address "0x0027" indicating a location of the region X, the region X size "4", the default value "3000", and the flag address "0x1003" indicating a location of the region Y are added, in association with each other.

Figure 7:
FIG. 7 is a table illustrating an exemplary configuration of a third storage unit.

Referring back to FIG. 1, the communication unit 6 communicates with other devices. The third storage unit 7 stores information about a storage location of the set value for which a non-readable and non-writable region in the first storage unit 3 where any data cannot be read nor written is designated as the storage location. More specifically, as illustrated in FIG. 6, the first storage unit 3 includes a third storage region for storing the set value for which the non-readable and non-writable region in the first region is designated as the storage location. Herein, the vacant region can be also considered as the third region. As illustrated in FIG. 7, the third storage unit 7 stores the set item corresponding to the set value stored in the third region, the head address before moving indicating the location in the first region where the set value is to be stored (the original storage location), and the head address (the second set value address) after moving indicating the location in the third region where the set value is actually stored (the actual storage location), in association with each other. The example of FIG. 7 illustrates that the set value "set value A" is stored at the location in the third region identified by the address after moving "0x2000", since the location in the first region where the set value "set value A" is to be stored (the location identified by the head address before moving "0x000") is non-readable and non-writable because of any trouble or the like.

The read and write control unit 8 illustrated in FIG. 1 controls reading the set value stored in the first storage unit 3 and writing the set value. In the present embodiment, if the read and write control unit 8 judges that a part of the first region of the first storage unit 3 designated as the storage location of the set value for which the writing is required is a non-readable and non-writable region where any data cannot be read nor written, the read and write control unit 8 writes the set value for which the writing is required in the aforementioned third region. The read and write control unit 8 also writes the set item of the set value for which the writing is required, and the second set value address, in association with each other, in the third storage unit 7.

Figure 8:
FIG. 8 is a table illustrating an exemplary configuration of the third storage unit.

If there is no vacant region in the first storage unit 3 (the third region), and the set value for which the writing is required and for which the non-readable and non-writable region of the first region is designated as the storage location, the read and write control unit 8 reads and writes the set value by means of a predetermined value. In this case, as illustrated in FIG. 8, the read and write control unit 8 can also indicate that the third region has no vacant region (the region to which the set value is moved) by setting a value of the head address after moving (the second set value address) corresponding to the set value for which the non-readable and non-writable region of the first region is designated as the storage location to an impossible value (e.g. 0x3000 for 12 KB device). In this case, the read and write control unit 8 reads and writes the set value by means of a predetermined value. For example, if the set value is required to be read, the read and write control unit 8 can read the default value corresponding to the set value required to be read from the second storage unit 4, so that the read default value becomes the read out data. Alternatively, the read and write control unit 8 can access an external server device to obtain a predetermined value stored in the server device, so that the obtained predetermined value becomes the read out data. If the set value is required to be written, the read and write control unit 8 can inform an error indicating the writing failure without writing any set value. Alternatively, the read and write control unit 8 can update the predetermined value stored in the external server device to the required writing value.

Figure 9:
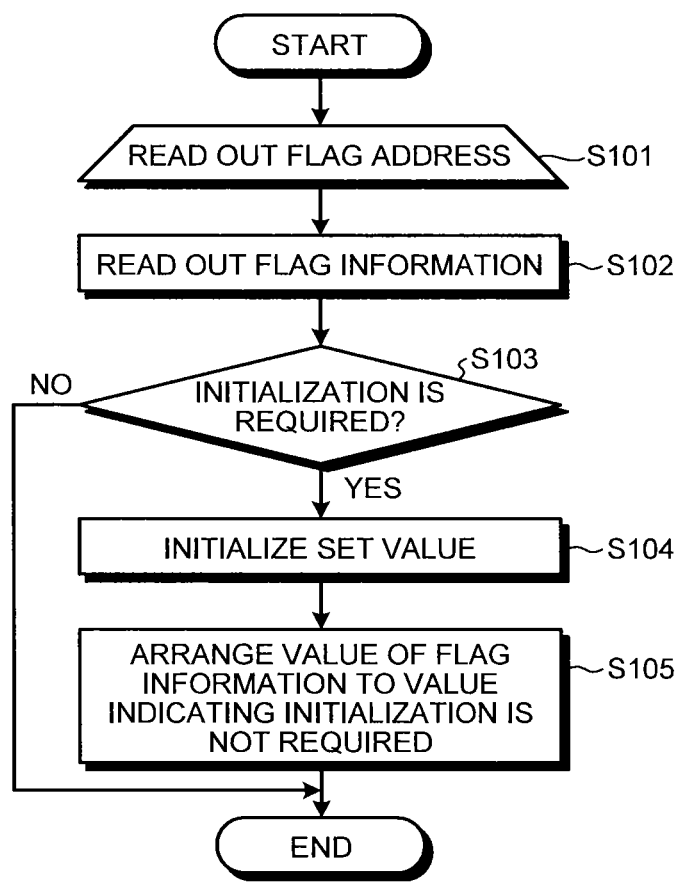
FIG. 9 is a flow chart illustrating an example of initializing processing.

Next, with reference to FIG. 9, the initialization process executed by the initialization unit 5 will be described. FIG. 9 is a flow chart illustrating an example of the initialization process executed by the initialization unit 5. The initialization unit 5 executes the initialization process for all the set items stored in the second storage unit 4.

Firstly, the initialization unit 5 reads out the flag address corresponding to the set item stored in the second storage unit 4 (step S101). Then, the initialization unit 5 reads out the flag information from the first storage unit 3 by means of the flag address read out at the step S101. Then, the initialization unit 5 judges whether the initialization of the set value is required or not with reference to the flag information read out at the step S102 (step S103). For example, if the value of the flag information is set at "1", it may be judged that the initialization is required. On the other hand, if the value of the flag information is set at "0", it may be judged that the initialization is not required. This example is not exclusive. The value of the flag information indicating that the initialization is required and the value of the flag information indicating that the initialization is not required can be freely changed.

If it is judged that the initialization is required (the judgment result of the step S103 is Yes), the initialization unit 5 initializes the set value of the set item corresponding to the flag information indicating that the initialization is required (step S104). More specifically, the initialization unit 5 reads out the default value, the storage location head address and the size corresponding to the set item from the second storage unit 4. Then, by writing the default value read out from the second storage unit 4 at the location of the first storage unit 3 identified by the read out storage location head address and size, the initialization unit 5 initializes the set value of the set item corresponding to the flag information indicating that the initialization is required. Then, the initialization unit 5 sets the flag information stored at the location in the first storage unit 3 identified by the flag address corresponding to the set item for which the initialization is done or performed to a value indicating that the initialization is not required (step S105). In other words, the initialization target flag is tuned off.

Figure 10:
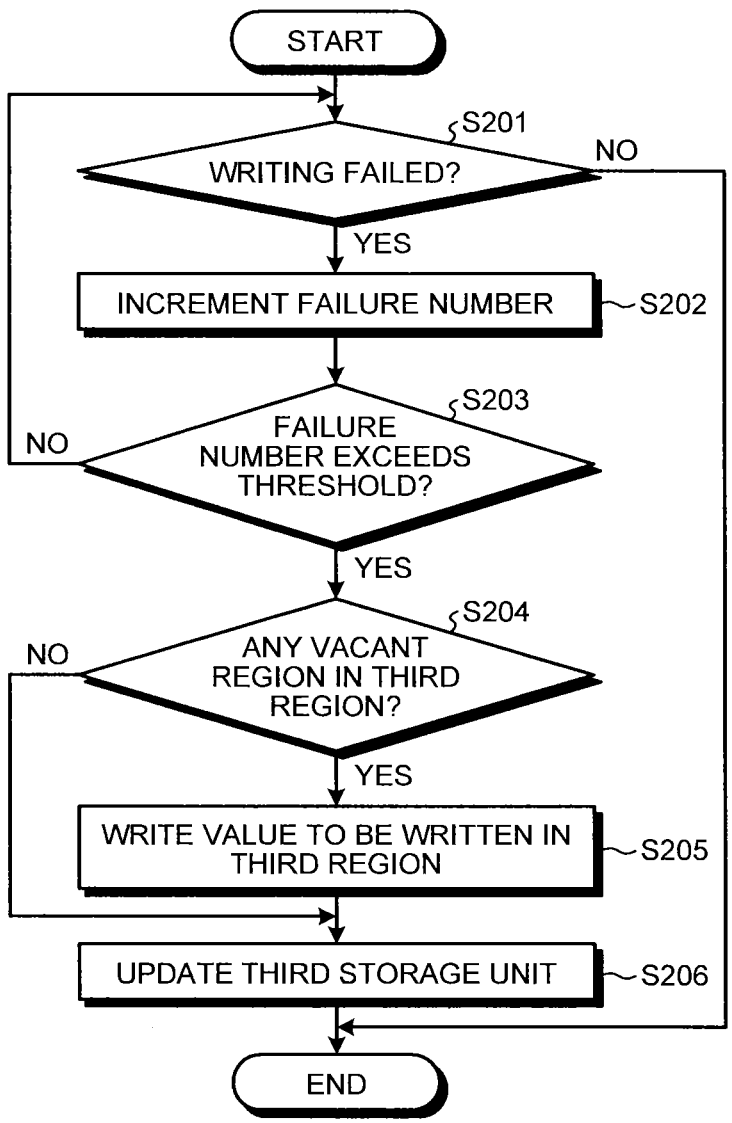
FIG. 10 is a flow chart illustrating an example of processing operation of a read and write control unit.

Next, the function of the read and write control unit 8 will be explained. FIG. 10 is a flow chart illustrating an example of the processing operation when the request to write the set value is received. Firstly, the read and write control unit 8 judges whether writing has been failed or not (step S201). If it is judged that the writing has been failed (the judgment result of step S201 is Yes), the read and write control unit 8 increments the failure number by one (step S202). Then, the read and write control unit 8 judges whether a counter value (total value) of the failure number exceeds a threshold value (step S203). In this example, if the failure number of writing exceeds a certain threshold, the storage location of the value required to be written is moved from the first region. However, the embodiment is not limited to this. For example, if the writing fails even only once, the storage location of the value required to be written may be moved at that time. Namely, the threshold value can be freely arranged.

If it is judged that the counter value of the failure number exceeds the threshold value (the judgment result of the step S203 is Yes), the read and write control unit 8 judges whether there is any vacant region in the third region of the first storage unit 3 (step S204). If it is judged that there is the vacant region (the judgment result of the step S204 is Yes), the read and write control unit 8 writes in the third region the value required to be written (step S205). Then, the process goes to step S206. When the storage location of the value required to be written is moved, an allocated region in the third region (vacant region) can be used sequentially from the head side thereof. In this case, if the information about the moving destination is checked, it is possible to judge how far the third region is used. Thus, it is possible to judge whether there is any vacant region in the third region. The embodiment is not limited to this. For example, the way to judge whether there is any vacant region in the third region may be freely arranged. On the other hand, if it is judged that there is no vacant region (the judgment result of the step S204 is No), the process goes to the step S206.

At the step S206, the read and write control unit 8 updates the content of the thirst storage unit 7. More specifically, if it is judged that there is any vacant region at the step S204, the read and write control unit 8 writes the set item corresponding to the set value required to be written, and the head address after moving (the second set value address) indicating the storage location of the set value in the third region, in association with each other, into the third storage unit 7. On the other hand, if it is judged that there is no vacant region at the step S204, the read and write control unit 8 writes the set item corresponding to the set value required to be written, and the head address after moving arranged to an impossible value, in association with each other, into the third storage unit 7.

In the present embodiment, if the firmware is updated, the content of the second storage unit 4 returns to a default status. Therefore, it is preferable to store the information indicating the moving destination in the third region as the information indicating the storage location into the second region 4, with regard to the set value for which a non-readable and non-writable region in the first region is designated as the storage location. In the present embodiment, every time when the information processing device 1 is started, the rewriting process to rewrite the content of the second storage unit 4 reflecting the content of the third storage unit 7 is executed before the aforementioned initialization process. This rewriting process may be executed by the initialization unit 5, or may be executed by the read and write control unit 8. Alternatively, the information processing device 1 may include a rewriting unit for executing the rewriting process, and this rewriting unit may execute the rewriting process. Namely, it is sufficient that the information processing device 1 executes the rewriting process. Hereinafter, the explanation is focused on the case that the rewriting process is executed by the initialization unit 5.

Figure 11:
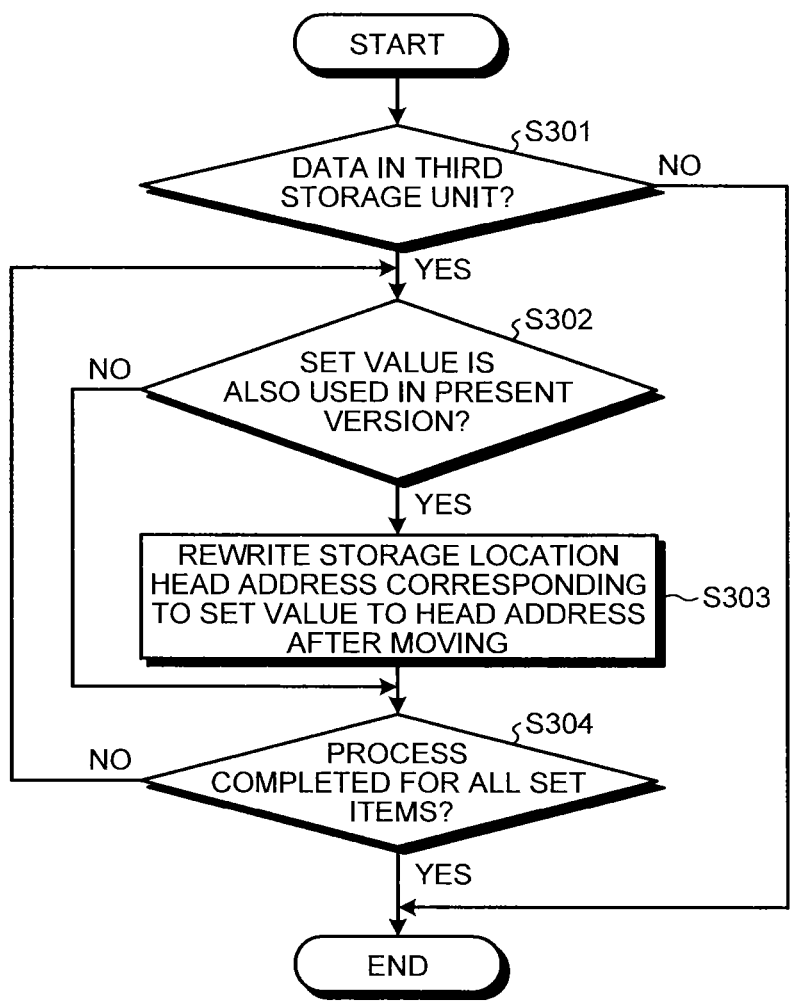
FIG. 11 is a flow chart illustrating an example of rewriting processing.

FIG. 11 is a flow chart illustrating an example of the rewriting process executed by the information processing device 1. As shown in FIG. 11, the initialization unit 5 firstly judges whether there is any data in the third storage unit 7 (step S301). If there is any data in the third storage unit 7, it means that the set value for which the non-readable and non-writable region in the first region is designated as the storage location is stored in the third region. If it is judge that there is any data in the third storage unit 7 (the judgment result of the step S301 is Yes), the rewriting is executed for each set item stored in the third storage unit 7. Further detail explanation will be given below.

The initialization unit 5 judges whether the set value corresponding to the set item stored in the third storage unit 7 is to be also used in the present version of firmware (step S302). If it is judged that the set value is to be also used in the present version of firmware (the judgment result of the step S302 is Yes), the initialization unit 5 rewrites the storage location head address corresponding to the set item to the head address after moving stored in the third storage unit 7 (step S303). Then, the process goes to step S304. On the other hand, if it is judge at the step S302 that the set value corresponding to the set item stored in the third storage unit 7 is not used any longer in the present version of firmware (the judgment result of the step S302 is No), the rewriting of the second storage unit 4 is not executed and the process goes to step S304. At the step S304, the initialization unit 5 judges whether the aforementioned process is completed for all the set items stored in the third storage unit 7. If it is judged that the process is completed for all the set items, the rewriting process ends. On the other hand, if it is judge that the process is not completed for all the set items, the process after the step S302 is repeated.

As explained above, in the present embodiment, every time when the information processing device 1 is started, the flag information is read out. In this case, the flag information is stored at the location in the first storage unit 3 identified by the flag address corresponding to the set item stored in the second storage unit 4. If the read out flag information indicates that the initialization is required, the set value corresponding to the set item is initialized. Therefore, when the set value is initialized in accordance with the update of the firmware, the set value can be initialized without downloading the conversion table, nor identifying the corresponding conversion table and the like. Also, there is no need for the releaser of the firmware to manage the conversion table. Namely, according to the present embodiment, it is possible to provide the information processing device capable of initializing the set value with a simple configuration.

In the present embodiment, the first storage unit 3, the second storage unit 4 and the third storage unit 7 are embodied as hardware circuitry. On the other hand, each of the projection unit 2, the initialization unit 5, the communication unit 6, and the read and write control unit 8 is embodied by executing programs stored in the ROM by CPU mounted on the information processing device 1. However, the embodiment is not limited to this. For example, at least part of the projection unit 2, the initialization unit 5, the communication unit 6, and the read and write control unit 8 may be embodied as hardware circuitry.

Various programs executed in the information processing device 1 according to the aforementioned embodiment may be embodied in such a manner that they are stored as installable or executable files in a computer readable recording medium such as CD-ROM, flexible disk (FD), CD-R, DVD (Digital Versatile Disk), USB (Universal Serial Bus) and the like, and the recording medium is provided or distributed. Alternatively, such programs may be provided or distributed via network such as Internet.

Modified Embodiment

Hereinbefore, the embodiments according to the present invention have been explained. However, the present invention is not limited to the aforementioned embodiments. Various modifications are possible without departing from the scope of the invention. Hereinafter, various modifications are explained as modified embodiments. The following embodiments can be freely combined.

(1) Modified Embodiment 1

Figures 12, 13:
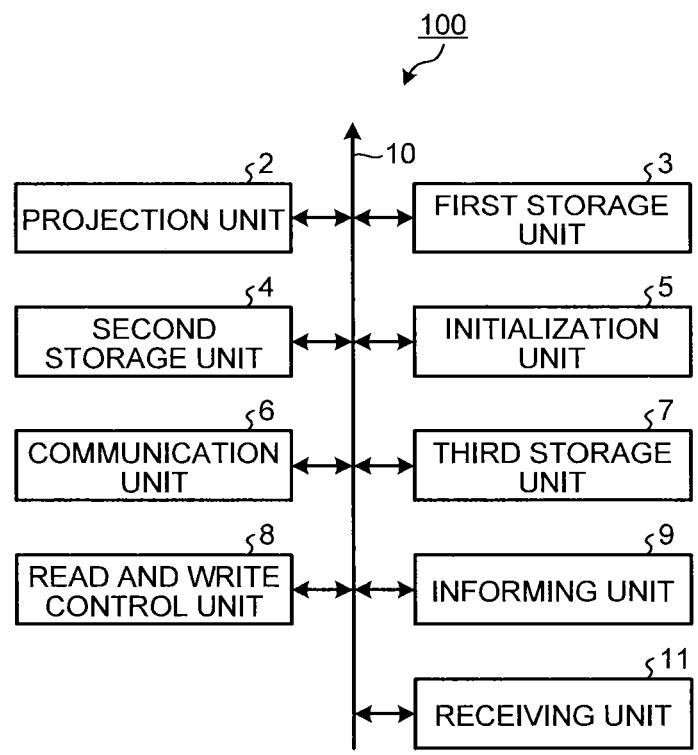
FIG. 12 is a block diagram of an exemplary configuration of an information processing device according to a modified embodiment.
FIG. 13 is a view illustrating an example of an informing image.

When a new set item is added in accordance with the update of the firmware (the update of the program for operating the information processing device), the information processing device may further include a informing unit to inform a fact that the new set item is to be added. FIG. 12 illustrates an exemplary configuration of the information processing device 100 in this case. As illustrated in FIG. 12, the information processing device 100 further includes the informing unit 9 and a receiving unit 11. For example, the informing unit 9 can prompt the user to select whether to arrange manually the default value of the set item to be added by displaying a pop-up such as an informing image as illustrated in FIG. 13 on a display unit at a timing of the step S104 in FIG. 9. When the receiving unit 11 receives the input of selecting whether to arrange manually the default value of the set item to be added, the initialization unit 5 arranges or sets the default value in response to the received input.

(2) Modified Embodiment 2

Figure 14:
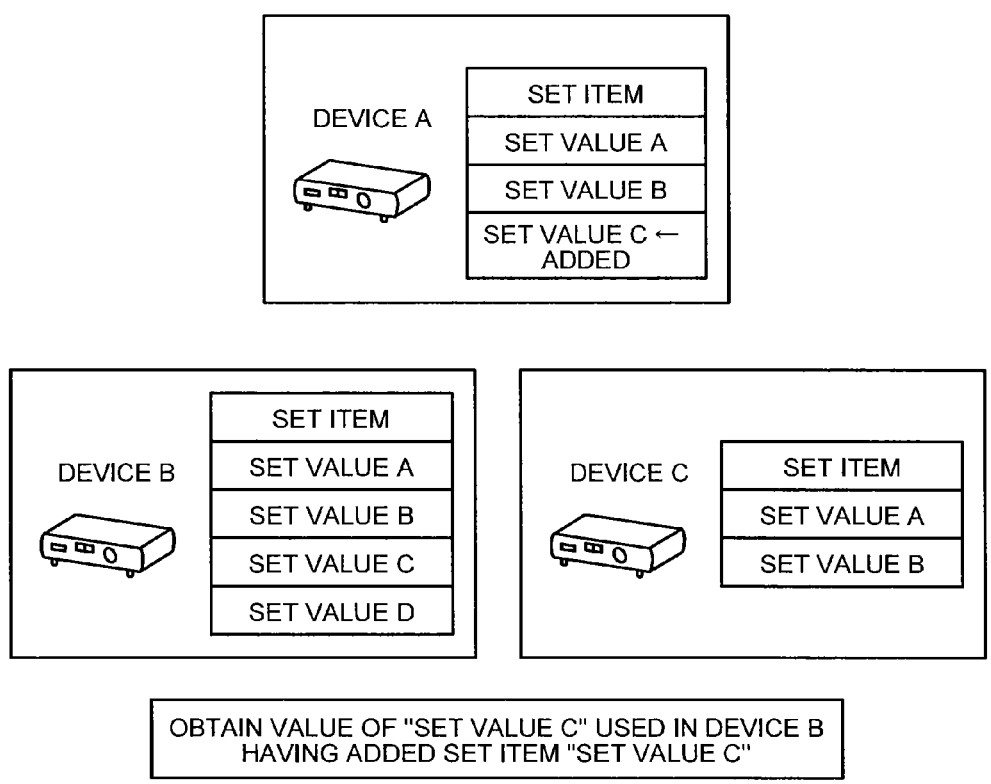
FIG. 14 is a view illustrating a plurality of information processing devices mutually connected via network.

When the set item newly added in accordance with the update of the firmware (the update of the program for operating the information processing device) is used in the external device connected with the information processing device via network, the initialization unit 5 can arrange or set the value of the set item used in the external device as the set value corresponding to the new set item. In an example of FIG. 14, when the set item represented by "set value C" is newly added to the device A in accordance with the update of the firmware, the initialization unit 5 of the device A searches the same network for any other device having the "set value C". Then, if there is any other device having the "set value C" in the same network, the initialization unit 5 obtains the value of the "set value C" used in the other device and arranges or sets the obtained value as the set value of the "set value C" added to the device A itself. In the example of FIG. 14, the device A obtains the value of the "set value C" used in the device B having the newly added set item "set value C", and arranges or sets the obtained value of "set value C" as the set value of the "set value C" added to the device A itself.

The way to transmit and receive data among devices connected via network is freely arranged. For example, data may be transmitted and received directly among devices, or may be transmitted and received via a relay device such as a server. If the set item newly added in accordance with the update of the firmware is used in a plurality of external devices, it is possible to select one or more external devices to be accessed (for obtaining the value) on the basis of a predetermined rule. The predetermined rule may be freely arranged. For example, the external device which uses most often the added set item can be selected as the access destination. Which device uses most often the set item can be determined on the basis of the lamp time of each external device, the function about the added set item, and so on. Alternatively, for example, the external device in which the value of the added set item is updated recently can be selected as the access destination. Alternatively, for example, the external device of the latest version or the same version of the device whose firmware is updated can be selected as the access destination. Alternatively, for example, when a plurality of set items are added in accordance with the update of the firmware, the external device having the largest number of common set items can be selected as the access destination.

Figure 15:
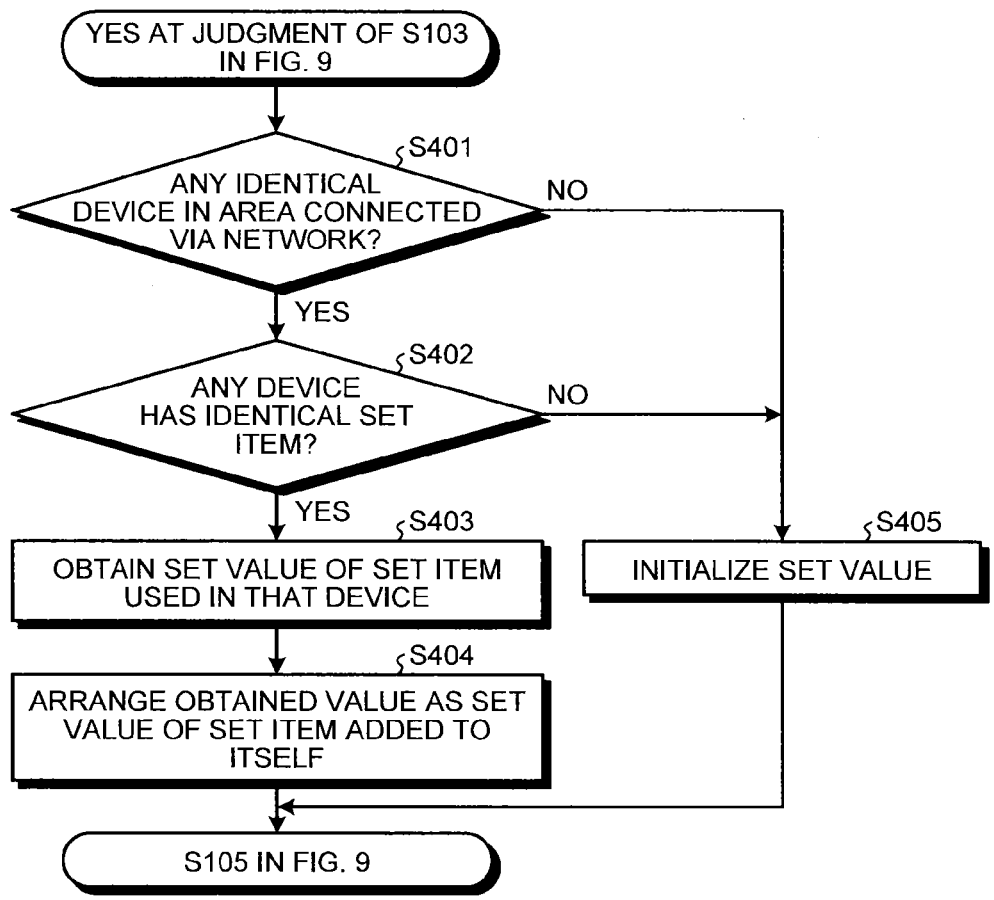
FIG. 15 is a flow chart illustrating a modified example of initializing processing.

FIG. 15 is a flow chart illustrating an example of the initialization process in this case. In an example of FIG. 15, the common parts with the initialization process illustrated in FIG. 9 are not repeatedly explained. Therefore, the explanation will be given for the process after the timing when it is judged that the initialization is required at the step S103 in FIG. 9. As illustrated in FIG. 15, the initialization unit 5 firstly judges whether there is any identical device with the device equipped with the initialization unit 5 in an area connected via network (step S401). If it is judged that there is no identical device in the area connected via network (the judgment result of the step S401 is No), the process goes to step S405. The content of the step S405 is the same as the content of the step S104 in FIG. 9. Therefore, the redundant explanation is herein omitted.

On the other hand, if it is judged that there is any identical device in the area connected via network (the judgment result of the step S401 is Yes), the initialization unit 5 judges whether there is any device having the same set item with the added set item (step S402). If it is judge that there is no device having the same set item (the judgment result of the step S402 is No), the process goes to step S405. If it is judge that there is any device having the same set item (the judgment result of the step S402 is Yes), the initialization unit 5 access that device to obtain the value of the set item (the same set item with the added set item) used in that device (Step S403). Then, the initialization unit 5 arranges or sets the valued obtained at the step S403 as the set value of the set item added to the initialization unit 5 itself (step S404). The process after that is the same as the process after the step S105 in FIG. 9.

(3) Modified Embodiment 3

Figures 16, 17:
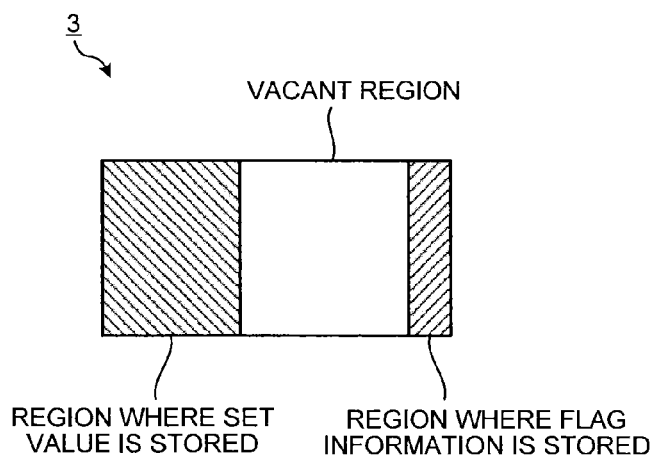
FIG. 16 is a view conceptually illustrating an exemplary configuration of the first storage unit according to a modified embodiment.
FIG. 17 is a table illustrating an exemplary configuration of the second storage unit according to a modified embodiment.

For example, as illustrated in FIG. 16, the region (the first region) in the first storage unit 3 where the set value is stored may be allocated sequentially from the head side of the first storage unit 3. The region (the second region) in the first storage unit 3 where the flag information is stored may be allocated sequentially from the tail side of the first storage unit 3. Thereby, the first storage device 3 which is a non-volatile device can be efficiently used.

(4) Modified Embodiment 4

For example, two or more set items dependent on each other may have a common flag address. In an example of FIG. 17, as flag address corresponding to each of "set value A" and "set value B" dependent on each other, a common flag address "0x1003" is assigned. The initialization unit 5 judges whether there is any set item having a common flag address with the set item to be initialized. If it is judged that there is any set item having the common flag address, the initialization unit 5 initializes also the set value identified by such a set item.

Figures 18, 19:
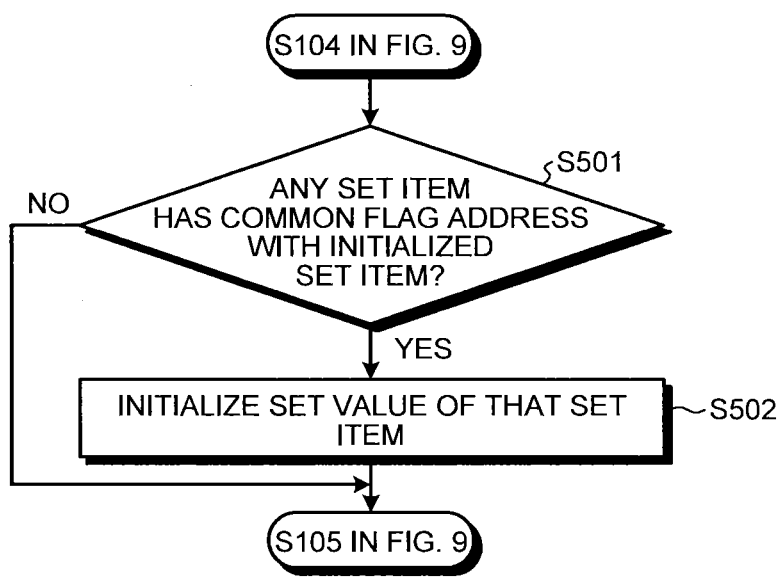
FIG. 18 is a flow chart illustrating a modified example of initializing processing.
FIG. 19 is a table illustrating an exemplary configuration of a fourth storage unit.

FIG. 18 is a flow chart illustrating an example of the initialization process in this case. In an example of FIG. 18, the common parts with the initialization process in FIG. 9 are not repeatedly illustrated. Therefore, the explanation will be started at timing immediately after the step S104 in FIG. 9. As illustrated in FIG. 18, the initialization unit 5 judges whether the set item having the common flag address with the set item initialized at the step S104 in FIG. 9 exists in the second storage unit 4 (step S501). If it is judged that the set item having the common flag address with the initialized set item (the judgment result of the step S501 is Yes), the initialization unit 5 initializes the set item having the common address with the initialized set item (step S502). Then, the process goes to step S105 in FIG. 9. On the other hand, if it is judge that any set item having the common flag address with the initialized set item does not exists (the judgment result of the step S501 is No), the process goes to step S105 in FIG. 9.

(5) Modified Embodiment 5

For example, as illustrated in FIG. 19, the information processing device may further include a fourth storage unit 12 for storing a set item and another set item depending on the former one, in associated with each other. The initialization unit 5 judges whether any set item depending on the set item to be initialized exists, with reference to the fourth storage unit 12. If it is judged that any set item depending on the set item to be initialized exists, the initialization unit 5 initializes also that dependent set item.

Figure 20:
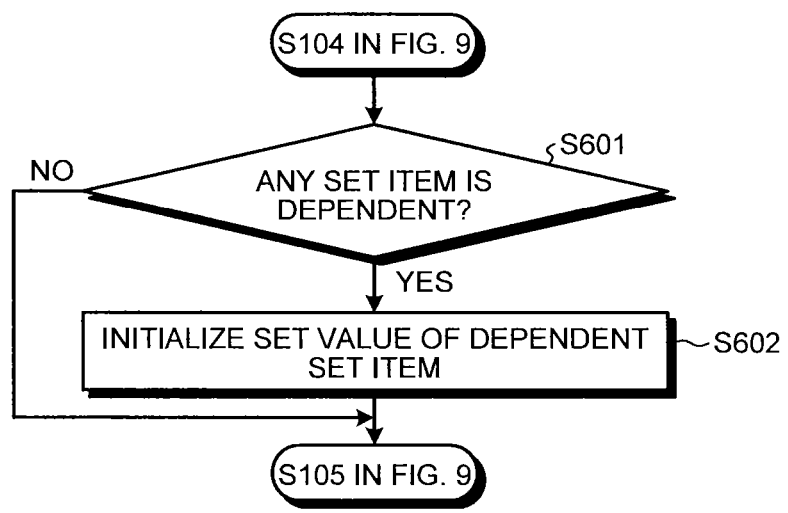
FIG. 20 is a flow chart illustrating a modified example of initializing processing.

FIG. 20 is a flow chart illustrating an example of the initialization process in this case. In an example of FIG. 20, the common parts with the initialization process in FIG. 9 are not repeatedly illustrated. Therefore, the explanation will be started at timing immediately after the step S104 in FIG. 9. As illustrated in FIG. 20, the initialization unit 5 judges whether any set item depending on the set item initialized at the step S104 in FIG. 9 exists, with reference to the fourth storage unit 12 (step S601). If it is judged that the set item depending on the initialized set item exists (the judgment result of the step S601 is Yes), the initialization unit 5 initializes also the set value identified by the set item depending on the initialized set item (step S602). Then, the process goes to step S105 in FIG. 9. On the other hand, if it is judged that any set item depending on the initialized set item does not exist (the judgment result of the step S601 is No), the process goes to step S105 in FIG. 9.

According to the present invention, there is provided an information processing device, an information processing method and a program product capable of initializing a set value advantageously with a simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
a first storage configured to store a value of a set item that defines a function, and flag information indicating whether an initialization of the value is required;
a second storage configured to store the set item in association with a flag address identifying a storage location of the flag information in the first storage; and
processor configured to identify the flag information for the set item by using the flag address corresponding to the set item, and if the identified flag address indicates that initialization of the value of the set item is required, initialize the value of the set item,
wherein after initialization of the value of the set item, the processor sets the flag information corresponding to the set item to indicate that initialization of the value of the set item is not required,
the second storage stores the set item in association with a first value address identifying a storage location of the value of the set item in the first storage, a default value to be used for the initialization of the value, and the flag address,
the processor writes the default value corresponding to the set item at a location in the first storage, the location being identified by the first value address corresponding to the set item, if the flag information corresponding to the set item indicates that initialization of the value of the set item is required,
the first storage includes a first region to store the value of the set item, a second region to store the flag information, and a third region to store the value of the set item for which a non-readable and non-writable region in the first region where data cannot be read and written is designated as a storage location, and
wherein the information processing device further comprises:
a third storage configured to store the set item corresponding to the value to be stored in the third region in association with a second value address indicating a storage location of the value of the set item in the third region, and
the processor is further configured to, if it is judged that a region in the first region designated as the storage location of the value required to be written is a non-readable and non-writable region where data cannot be read and written, write the value required to be written in the third region in association with the set item corresponding to the value required to be written and the second value address-in the third storage.

2. The information processing device according to claim 1, wherein
the processor reads and writes the value of the set item using a predetermined value, if the value for which the non-readable and non-writable region in the first region is designated as the storage location is required to be written, when there is no vacant region in the third region.

3. An information processing method comprising:
reading out a flag address for each set item with reference to a second storage, in which a value of a set item that defines a function and flag information indicating whether an initialization of the value of the set item is required are stored in a first storage, and the flag address for identifying a storage location of the flag information in the first storage is stored in association with the set item in the second storage;
reading out the flag information from the first storage, the flag information being identified by the read out flag address;
initializing the value of the set item, when the flag information indicates that the initialization of the value of the set item is required; and
after initialization of the value of the set item, setting the flag information stored in the first storage to indicate that initialization of the value of the set item is not required,
wherein the second storage stores the set item in association with a first value address identifying a storage location of the value of the set item in the first storage, a default value to be used for the initialization of the value, and the flag address,
the method further comprises writing the default value corresponding to the set item at a location in the first storage, the location being identified by the first value address corresponding to the set item, if the flag information corresponding to the set item indicates that initialization of the value of the set item is required,
the first storage includes a first region to store the value of the set item, a second region to store the flag information, and a third region to store the value of the set item for which a non-readable and non-writable region in the first region where data cannot be read and written is designated as a storage location, and
wherein method comprises:
storing, in a third storage, the set item corresponding to the value to be stored in the third region in association with a second value address indicating a storage location of the value of the set item in the third region, and
if it is judged that a region in the first region designated as the storage location of the value required to be written is a non-readable and non-writable region where data cannot be read and written, writing the value required to be written in the third region in association with the set item corresponding to the value required to be written and the second value address-in the third storage.

4. A non-transitory computer-readable medium having computer-readable program codes embedded therein, the program codes when executed by a computer cause the computer to perform a method comprising:
reading out a flag address for each set item with reference to a second storage, in which a value of a set item that defines a function and flag information indicating whether an initialization of the value of the set item is required are stored in a first storage, and the flag address for identifying a storage location of the flag information in the first storage is stored in association with the set item in the second storage;
reading out the flag information from the first storage, the flag information being identified by the read out flag address;
initializing the value of the set item, when the flag information indicates that the initialization of the value of the set item is required; and
after initialization of the value of the set item, setting the flag information stored in the first storage to indicate that initialization of the value of the set item is not required,
wherein the second storage stores the set item in association with a first value address identifying a storage location of the value of the set item in the first storage, a default value to be used for the initialization of the value, and the flag address, the method further comprises writing the default value corresponding to the set item at a location in the first storage, the location being identified by the first value address corresponding to the set item, if the flag information corresponding to the set item indicates that initialization of the value of the set item is required, the first storage includes a first region to store the value of the set item, a second region to store the flag information, and a third region to store the value of the set item for which a non-readable and non-writable region in the first region where data cannot be read and written is designated as a storage location, and wherein method comprises:

storing, in a third storage, the set item corresponding to the value to be stored in the third region in association with a second value address indicating a storage location of the value of the set item in the third region, and if it is judged that a region in the first region designated as the storage location of the value required to be written is a non-readable and non-writable region where data cannot be read and written, writing the value required to be written in the third region in association with the set item corresponding to the value required to be written and the second value address-in the third storage.

* * * * *